United States Patent Office

3,298,960
Patented Jan. 17, 1967

---

3,298,960
METHOD FOR THE DISPOSAL OF WASTE SOLUTIONS USING RIGID GELS
Edgar C. Pitzer, Scotia, N.Y., assignor to the United States of America as represented by the United States Atomic Energy Commission
No Drawing. Filed June 17, 1964, Ser. No. 375,984
15 Claims. (Cl. 252—301.1)

This invention relates to a method of disposing of waste solutions. More particularly, this invention relates to a method of converting solutions containing waste products into solid gels which are convenient for handling and storage.

In the past, several methods were employed to dispose of waste solutions. Among the more common methods used were evaporation, ion exchange, precipitation and filtration, and encapsulation. The first three methods, i.e., evaporation, ion exchange, precipitation and filtration, were unattractive from the standpoint that relatively expensive equipment was required to effect the processes, and this expense was particularly exaggerated when special equipment and handling were required to treat waste solutions containing extremely dangerous substances such as poisons or radioactive wastes. The latter of the four methods, i.e., encapsulation in concrete by the addition of Portland cement to the waste solution, had the drawback that the weight of cement and aggregate required was about twice that of the liquid, which resulted in a marked increase in the weight and volume of the material to be handled.

It is apparent, then, that a process which would overcome these disadvantages of the prior art in an economical way would be a tremendous improvement. It has been discovered that such an improvement may be had by the addition of a gel forming material to the waste bearing solutions.

It is the primary object of this invention to provide a process whereby disposal of chemical waste solutions may be effected in hydrogel material.

A further object of this invention is to provide a process whereby liquid waste solutions may be solidified to facilitate handling.

An additional object of this invention is to provide a simple, economic method of safely handling and disposing of waste solutions which contain extremely dangerous substances, such as radioactive material.

Other and further objects will become apparent to those skilled in the art from the description and examples disclosed hereinafter.

The gel products according to this invention are formed by the addition of sodium silicate or formaldehyde to certain metal cleaning waste solutions. The waste solutions employed in conjunction with this invention are notably of three types. One solution contains metal corrosion products dissolved in hydrazine and ethylenediaminetetraacetic acid (EDTA). The other two types of waste solutions contain metal corrosion products dissolved in an aqueous solution of diammonium citrate or an acidified solution of sodium hydroxide and potassium permanganate. These waste solutions are the resultants of the application of the metal cleaning solutions to inaccessible metal surfaces, such as in shell and tube heat exchangers, boiler tubes, nuclear reactors, and others.

The addition of sodium silicate to the hydrazine-ethylenediaminetetraacetic acid within certain concentration ranges produced a rapid gelation. The following example will serve to illustrate one specific embodiment of this invention.

*Example I*

Twenty-five milliliters of a solution containing 0.1 molar ethylenediaminetetraacetic acid and 0.5 molar hydrazine formed a thick slush which was not firm upon the addition of 0.3 gram of sodium silicate. The addition of larger amounts, i.e., in a weight ratio of at least 1:2 of sodium silicate to the hydrazine and ethylenediaminetetraacetic acid solution produced a solid, vibrant gel.

A similar performance was obtained with the addition of formaldehyde to the hydrazine-ethylenediaminetetraacetic acid solution. Formaldehyde reacts with hydrazine over a wide concentration range to form an insoluble compound. Acetaldehyde, benzaldehyde, acrolein, and furfural are alternative aldehydes which may be used in place of formaldehyde to produce an azine gel.

*Example II*

A thick slushy gel formed upon the addition of 0.4 to 0.6 gram of formaldehyde to 25 milliliters of a solution of 0.1 molar ethylenediaminetetraacetic acid and 0.5 molar hydrazine. At higher concentrations of 0.6 to 1.0 gram of the formaldehyde, or in a weight ratio of approximately 1:2, a firm gel formed from the above hydrazine-EDTA solution which became opaque after 2 hours.

A combination of these gelling agents, as well as the separate application of these agents, will also result in the production of a gel with the waste solutions. The addition of a mixture of sodium silicate and formaldehyde to a solution of hydrazine and ethylenediaminetetraacetic acid will result in an interlocking gel of azine and silica. The performance which occurs is much the same as that which occurs with the gelling agents employed separately, however, the gelling reaction is somewhat more rapid.

Sodium silicate was also found to effectively gel other waste solutions having a diammonium citrate base. Concentrated and dilute solutions of diammonium citrate were gelled by the addition of sodium silicate with equal ease.

*Example III*

A solution containing 0.25 gram of sodium silicate in 12 milliliters was added to 100 milliliters of an aqueous solution containing 0.6 gram of diammonium citrate. The solution set to a firm vibrant gel within five minutes.

A more concentrated solution of diammonium citrate, i.e., 100 grams/liter, was reacted in a similar manner, except the gel required an hour to set firmly.

Sodium silicate will effectively gel an alkaline permanganate metal cleaning solution which has been acidified to a pH range of 4 to 6 by the addition of acetic or phosphoric acid. Optimum setting temperatures are between 18° and 50° C.

*Example IV*

Five milliliters of solution containing 1.5 grams of sodium silicate were added to 50 milliliters of an alkaline permanganate solution containing 0.3 gram of sodium hydroxide and 0.6 gram of potassium permanganate which had been acidified with 2.87 grams of sodium metabisulfite. A firm, vibrant gel set quickly.

*Example V*

One hundred milliliters of an alkaline permangate solution containing 10 grams of sodium hydroxide and 3 grams of potassium permanganate were acidified with 12 milliliters of 85% phosphoric acid. Approximately one hour after 20 milliliters of sodium silicate were added, a firm, vibrant jelly was produced.

As may be noted from the foregoing examples, the present invention may be employed with a wide variety of metal cleaning compositions. The cleaning compositions may be organic or inorganic in nature. If the cleaning composition is organic or inorganic and sodium silicate is employed as the gelling agent, the main consideration is the adjustment of the pH of the solution to a slightly acid range prior to addition of the sodium silicate. If the cleaning composition is composed of organic ingredients, hydrazine must be present in the composition or must be added in order to form an insoluble gel with the aldehyde.

For metal cleaning compositions which have been loaded with dangerous radioactive materials, the addition of a gelling agent provides a simple economical method for the handling of the solutions. The waste containing gels may be formed for disposal in 5 to 50 gallon metal containers or drums which have airtight lids. Water which extrudes from the gel may be allowed to evaporate or may be absorbed with plaster of Paris before sealing the airtight lids.

The gelling agents according to this invention are advantageous from the standpoint that the solutions may be solidified at the expense of only a slight increase in weight. Solidification of these radioactive waste solutions is an obvious safety expedient since even if the containers are ruptured or are rendered defective through corrosion, the radioactive liquids will not flow and escape if they are in a gelled condition. The most attractive feature of this invention is the safety aspect of solidification with only a small weight increase where radioactive wastes must be shipped considerable distances before final disposal.

It is to be understood that certain changes and modifications can be performed on the process disclosed herein without departing from the spirit and scope of the invention.

Having thus described my invention, I claim:

1. A process for the encapsulation of radioactive wastes comprising adding a gelling agent to a solution of hydrazine and ethylenediaminetetraacetic acid containing dissolved radioactive wastes, in an amount sufficient to produce a solid, vibrant gel.

2. A process according to claim 1 wherein the gelling agent is sodium silicate.

3. A process according to claim 1 wherein the gelling agent is formaldehyde.

4. A process for the encapsulation of radioactive waste disposal comprising adding sodium silicate to a solution of diammonium citrate containing dissolved radioactive wastes, in an amount sufficient to produce a solid, vibrant gel.

5. A process for the disposal of radioactive wastes by encapsulation comprising adding sodium silicate to an acidified solution containing potassium permanganate and sodium hydroxide having radioactive wastes dissolved therein, in an amount sufficient to produce a solid, vibrant gel.

6. A process according to claim 5 wherein the solution is acidified with acetic acid.

7. A process according to claim 5 wherein the solution is acidified with phosphoric acid.

8. A process according to claim 5 wherein the solution is acidified with sodium metasulfite.

9. A gel produced by the addition of a gelling agent to a solution of hydrazine and ethylenediaminetetraacetic acid containing radioactive wastes.

10. A gel according to claim 9 wherein the gelling agent is sodium silicate.

11. A gel according to claim 9 wherein the gelling agent is formaldehyde.

12. A gel produced by the addition of sodium silicate to an acidified solution of potassium permanganate and sodium hydroxide containing radioactive wastes.

13. A gel according to claim 12 wherein the solution is acidified with acetic acid.

14. A gel according to claim 12 wherein the solution is acidified with phosphoric acid.

15. A gel according to claim 12 wherein the solution is acidified with sodium metalsulfite.

References Cited by the Examiner

UNITED STATES PATENTS

| | | | |
|---|---|---|---|
| 2,908,547 | 10/1959 | Nicholls et al. | 23—339 |
| 3,013,978 | 12/1961 | Rosinski | 252—301.1 |
| 3,054,746 | 9/1962 | Gaden et al. | 252—301.1 |
| 3,054,747 | 9/1962 | Gaden et al. | 252—301.1 |
| 3,112,275 | 11/1963 | Pollock et al. | 252—301.1 |
| 3,154,500 | 10/1964 | Jansen et al. | 252—301.1 |
| 3,161,599 | 12/1964 | Black | 252—301.1 |
| 3,196,619 | 7/1965 | Shock | 252—301.1 |
| 3,265,627 | 8/1966 | Clark et al. | 252—301.1 |

CARL D. QUARFORTH, *Primary Examiner.*

S. J. LECHERT, Jr., *Assistant Examiner.*